Jan. 24, 1956 R. MAGERS 2,732,546
SPEEDOMETER CABLE DISCONNECT DETECTOR
Filed April 1, 1955
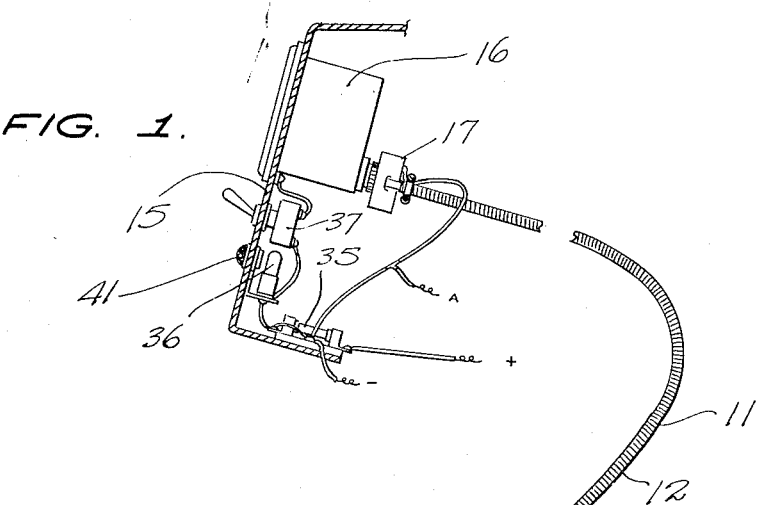
FIG. 1.
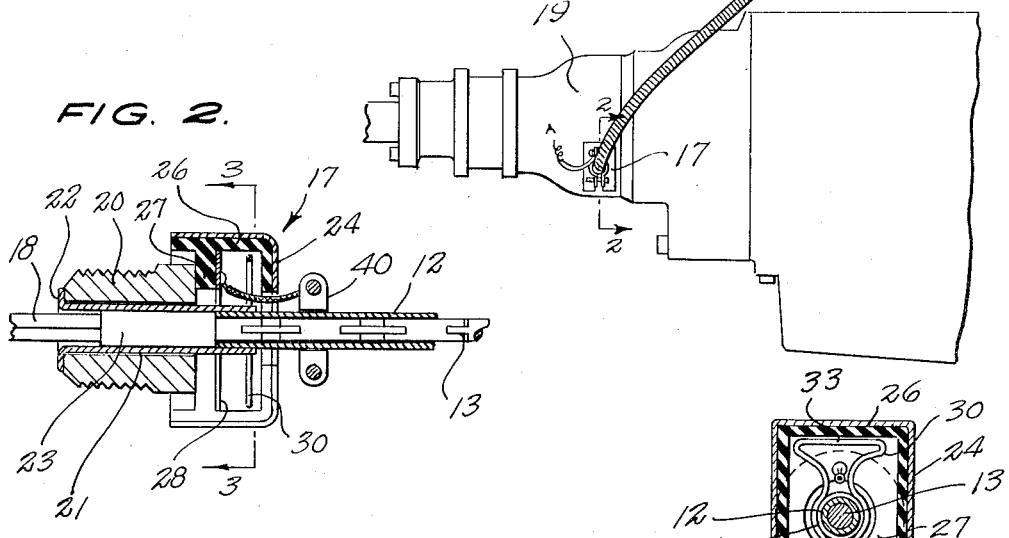
FIG. 2.
FIG. 3.
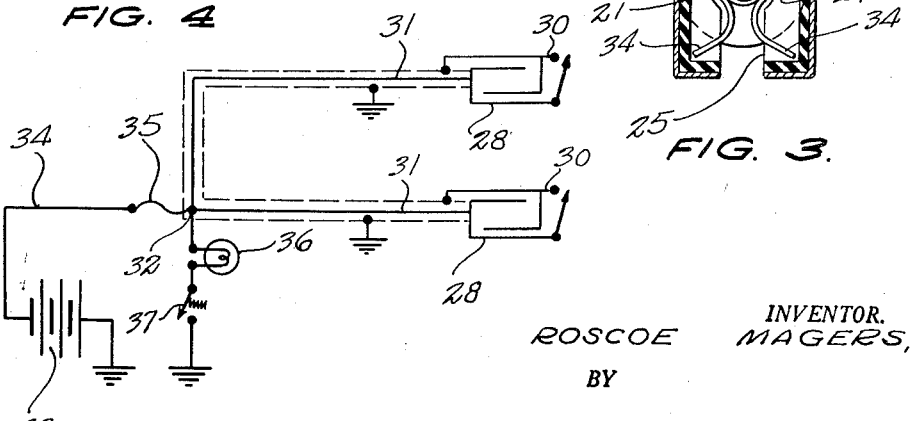
FIG. 4
INVENTOR.
ROSCOE MAGERS,
BY
McMorrow, Berman + Davidson
ATTORNEYS.

United States Patent Office 2,732,546
Patented Jan. 24, 1956

2,732,546

SPEEDOMETER CABLE DISCONNECT DETECTOR

Roscoe Magers, Vallejo, Calif.

Application April 1, 1955, Serial No. 498,632

3 Claims. (Cl. 340—280)

This invention relates to indicating devices for indicating whether or not a speedometer cable has been disconnected, whereby the renter of a motor vehicle can determine whether the mileage registered by the vehicle speedometer is accurate and can detect any attempt made to tamper with the speedometer cable.

A main object of the invention is to provide a novel and improved indicator for detecting whether the speedometer shaft of a motor vehicle has been disconnected, the improved indicator being simple in construction, being easy to install, and providing a positive indication of previous tampering with the connection of the speedometer cable of the vehicle on which it is employed.

A further object of the invention is to provide an improved indicator to detect whether the speedometer cable of a motor vehicle has been disconnected, the indicating device involving inexpensive components, being easy to operate, and being relatively easy to reset.

Further objects and advantages of the invention will become apparent from the following description and claims, and from the accompanying drawings, wherein:

Figure 1 is a fragmentary vertical cross sectional view taken through the instrument panel of a motor vehicle provided with an improved indicator device according to the present invention, showing the speedometer cable and the connection of the speedometer cable to the transmission of the motor vehicle.

Figure 2 is an enlarged cross sectional view taken on the line 2—2 of Figure 1.

Figure 3 is a cross sectional view taken on the line 3—3 of Figure 2.

Figure 4 is a schematic wiring diagram showing the electrical connections of the indicator device employed in Figures 1, 2 and 3.

Referring to the drawings, 11 designates a conventional speedometer cable assembly, comprising a sheath 12 and a flexible cable element 13 rotatably supported in the sheath 12. 15 designates the vehicle instrument panel, and mounted on said panel in the conventional manner is the speedometer 16. Respective coupling assemblies 17, 17 are employed at the ends of the speedometer cable 11 to connect the squared end portions 18 of the shaft 13 to the respective mating elements of the speedometer 16 and the transmission 19 of the vehicle, whereby a driving connection is provided between the transmission and the speedometer 16 for actuating the speedometer.

As shown in Figure 2, each coupling assembly 17 comprises an externally threaded plug element 20 adapted to be threadedly engaged in a suitable socket provided therefor, such sockets being provided respectively on the speedometer 16 and on the transmission 19. The respective ends of the sheath 12 are secured in respective terminating sleeves 21, said sleeves extending axially through the plugs 20 and having annular outwardly projecting end flanges 22 which are engaged by the ends of the respective plugs 20 to anchor the sleeves 21 respectively to the speedometer 16 and transmission 19. The sleeves 21 contain the respective rotatable spindles 23 to which the respective ends of the flexible shaft 13 are connected, each spindle 23 having the squared end portion 18 for coupling the ends of the shaft 13 respectively to the speedometer mechanism and to the transmission mechanism of the vehicle to provide the driving connection between the transmission and the speedometer.

Designated at 24 is a housing having an open-ended slot 25 therein whereby the housing may be slipped over the end portion of a sleeve 21 in the manner shown in Figures 2 and 3, each housing 24 having an insulating inner lining 26 formed with an internal rib element 27 engageable against the end surface of the associated plug member 20, as shown in Figure 2. Secured to the inner face of each rib 27 is a contact plate 28. Engaged on the end portion of each sleeve 21 and being normally spaced from the contact plate 28 is a spring clip 30, shown in Figures 2 and 3, and being shaped to support the housing 24 with the sleeve 21 substantially centered therein, as shown in Figure 3.

Thus, the spring clip 30 has the enlarged top portion 33 which fits in the top end of the housing 24 and has the outwardly and downwardly inclined bottom legs 34, 34 which extend into the lower corners of the housing 24, as is clearly shown in Figure 3. Thus, the housing 24 is normally held in the position thereof shown in Figure 2, but if any attempt is made to unscrew the plug member 20, the contact element 28 is moved rearwardly and engages the supporting spring 30.

Referring to Figure 4, it will be seen that an insulated wire 31 is connected to each contact plate 28, the wires 31 being connected to a common terminal 32. Connected between the ungrounded terminals of the vehicle battery 33 and the terminal 32, as by a wire 34 is a fuse 35. Connected in series between the terminal 32 and the vehicle ground are the indicator lamp 36 and the normally open switch 37. As will be apparent from Figure 4, when the switch 37 is closed, with the fuse 35 intact, the lamp 36 will be illuminated. However, if the fuse 35 is blown, as, for example, by a previous contact between a plate member 28 and a contact spring 30, the lamp 36 will not be energized when the switch 37 is closed. As above explained, when attempt is made to disconnect either end of the speedometer shaft, a contact plate 28 is engaged with a spring 30, which thus grounds the contact plate 28, and which thus connects the fuse 35 across the battery 33, causing the fuse to be blown. Therefore, the renter of a vehicle may readily determine whether any attempt has been made to disconnect the speedometer shaft of the vehicle by merely momentarily closing the switch 37 to determine whether the lamp 36 can be energized. Naturally, if no attempt has been made to tamper with the speedometer shaft, the fuse 35 will be intact and the lamp 36 will provide illumination, indicating that the fuse 35 has not been blown.

As shown in Figure 2, the insulated wire 31 extending from each housing 24 is supported by a suitable clamp bracket 40 engaged on the sheath 12 of the speedometer shaft adjacent the associated housing 24. As shown in Figure 1, the indicator lamp 36 may be mounted behind the instrument panel 15 and may be observed through a suitable conventional pilot lamp lens 41 provided on the panel forwardly adjacent the lamp 36.

While a specific embodiment of an improved indicator means for indicating whether a speedometer shaft of a motor vehicle has been tampered with has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a speedometer shaft detachably connected to a rotary element of the vehicle, an indicating circuit comprising a grounded portion, a switch, an indicator, a fuse, and a battery, all connected in series, whereby said indicator will normally be energized when said switch is closed, a conductor connected to the ungrounded side of said indicator and secured to said speedometer shaft adjacent its connection to the rotary element, and grounded contact means arranged to conductively engage said conductor when the shaft is moved toward a disconnected position relative to said rotary element, whereby said fuse will be blown, and whereby said indicator will not be energized when said switch is closed.

2. In a motor vehicle, a speedometer shaft, a flanged coupling sleeve carried by said shaft, a coupling bushing on said sleeve, a contact element on said shaft engaged by but insulated from said bushing, said bushing being arranged to secure said shaft in coupling engagement with a rotary element of the vehicle, an indicating circuit comprising a grounded portion, a switch, an indicator, a fuse, and a battery, all connected in series, whereby said indicator will normally be energized when said switch is closed, a conductor connecting the ungrounded side of said indicator to said contact element, and grounded contact means arranged to conductively engage said contact element when the bushing is moved toward a position to disconnect said shaft from said rotary element, whereby said fuse will be blown, and whereby said indicator will not be energized when switch is closed.

3. In a motor vehicle, a speedometer shaft, a flanged coupling sleeve carried by said shaft, a coupling bushing on said sleeve, a contact element on said shaft engaged by but insulated from said bushing, said bushing being arranged to secure said shaft in coupling engagement with a rotary element of the vehicle, an indicating circuit comprising a grounded portion, a switch, an indicator, a fuse, and a battery, all connected in series, whereby said indicator will normally be energized when said switch is closed, a conductor connecting the ungrounded side of said indicator to said contact element, said shaft having a grounded sheath, and conductive means on said sheath arranged to conductively engage said contact element when the bushing is moved toward a position to disconnect said shaft from said rotary element, whereby said fuse will be blown, and whereby said indicator will not be energized when said switch is closed.

References Cited in the file of this patent
UNITED STATES PATENTS

| | | |
|---|---|---|
| 420,070 | Howey | Jan. 28, 1890 |
| 1,373,242 | Hellman | Mar. 29, 1921 |
| 2,463,339 | Wetzel et al. | Mar. 1, 1949 |